United States Patent
Sharique et al.

(10) Patent No.: US 9,489,409 B2
(45) Date of Patent: Nov. 8, 2016

(54) ROLLOVER STRATEGIES IN A N-BIT DICTIONARY COMPRESSED COLUMN STORE

(71) Applicants: Muhammed Sharique, Pune (IN); Anil Kumar Goel, Waterloo (CA); Minhnea Andrei, Issy les Moulineaux (FR)

(72) Inventors: Muhammed Sharique, Pune (IN); Anil Kumar Goel, Waterloo (CA); Minhnea Andrei, Issy les Moulineaux (FR)

(73) Assignee: SYBASE, INC., Dublin, CA (US)

( * ) Notice: Subject to any disclaimer, the term of this patent is extended or adjusted under 35 U.S.C. 154(b) by 400 days.

(21) Appl. No.: 14/056,454

(22) Filed: Oct. 17, 2013

(65) Prior Publication Data

US 2015/0113026 A1    Apr. 23, 2015

(51) Int. Cl.
*G06F 17/30* (2006.01)

(52) U.S. Cl.
CPC ... *G06F 17/30315* (2013.01); *G06F 17/30091* (2013.01); *G06F 17/30312* (2013.01)

(58) Field of Classification Search
CPC .............. G06F 17/30153; G06F 17/30188; G06F 17/30091; G06F 17/30312; G06F 17/30315
USPC ........................................................ 707/812
See application file for complete search history.

(56) References Cited

U.S. PATENT DOCUMENTS

| | | | |
|---|---|---|---|
| 6,014,674 A | 1/2000 | McCargar | |
| 6,169,990 B1* | 1/2001 | McGregor | G06F 17/30952 |
| 6,618,719 B1 | 9/2003 | Andrei | |
| 7,047,250 B1 | 5/2006 | Agarwal et al. | |
| 7,146,386 B2 | 12/2006 | Xiao | |
| 7,496,589 B1* | 2/2009 | Jain | G06F 17/30315 |
| 7,933,881 B2 | 4/2011 | Richey et al. | |
| 8,204,856 B2 | 6/2012 | Meyer et al. | |
| 8,612,673 B2 | 12/2013 | Cheriton | |
| 2010/0030748 A1* | 2/2010 | Netz | G06F 17/30492 707/769 |
| 2010/0325094 A1 | 12/2010 | Yang et al. | |
| 2011/0093500 A1 | 4/2011 | Meyer et al. | |
| 2011/0219020 A1* | 9/2011 | Oks | G06F 17/30315 707/769 |
| 2011/0246432 A1 | 10/2011 | Yang et al. | |
| 2011/0295817 A1 | 12/2011 | Chandrasekar et al. | |
| 2012/0221528 A1 | 8/2012 | Renkes et al. | |
| 2013/0060780 A1* | 3/2013 | Lahiri | H03M 7/3088 707/741 |
| 2013/0166554 A1 | 6/2013 | Yoon et al. | |
| 2013/0232176 A1 | 9/2013 | Plattner et al. | |
| 2013/0254171 A1* | 9/2013 | Grondin | G06F 17/30566 707/693 |
| 2014/0136788 A1* | 5/2014 | Faerber | G06F 17/30315 711/133 |
| 2014/0279959 A1* | 9/2014 | Marwah | G06F 17/30489 707/693 |

\* cited by examiner

*Primary Examiner* — James Trujillo
*Assistant Examiner* — Jessica N Le
(74) *Attorney, Agent, or Firm* — Sterne, Kessler, Goldstein & Fox P.L.L.C.

(57) ABSTRACT

Disclosed herein are system, method, and computer program product embodiments for rollover strategies in an n-bit dictionary compressed column store. An embodiment operates by receiving a new value for addition to a compressed column store, determining that a current memory block of a most recently added token to the compressed column store is the insertion block. It is determined that the maximum token value has been reached for the current memory block. A new virtual memory block is created using the current insertion block, and a token corresponding to the new value is stored in the new virtual memory block. In another embodiment, when it is determined a maximum number of token values that may be stored in a compressed column store has been reached for a data dictionary, the compressed column store is converted into a composite store include a flat store where the new value is stored.

17 Claims, 5 Drawing Sheets

ROLLOVER STRATEGIES IN A N-BIT DICTIONARY COMPRESSED COLUMN STORE

BACKGROUND

Databases are typically organized as either row-oriented databases or column-oriented databases. In a dictionary compressed column-oriented database, values are stored in a dictionary, while tokens corresponding to the values are stored in memory blocks of the database. Each memory block has a type of encoding allowing it to store a particular number of tokens. However, when then memory block can no longer accommodate a new token, the memory block must be re-encoded so that it may store new token values. The re-encoding process however may consume additional systems processing and memory resources, delay system processing, and cause data inconsistencies when the existing data is being accessed by one or more other systems or users.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing rollover strategies in an n-bit dictionary compressed column store.

Figure 1:
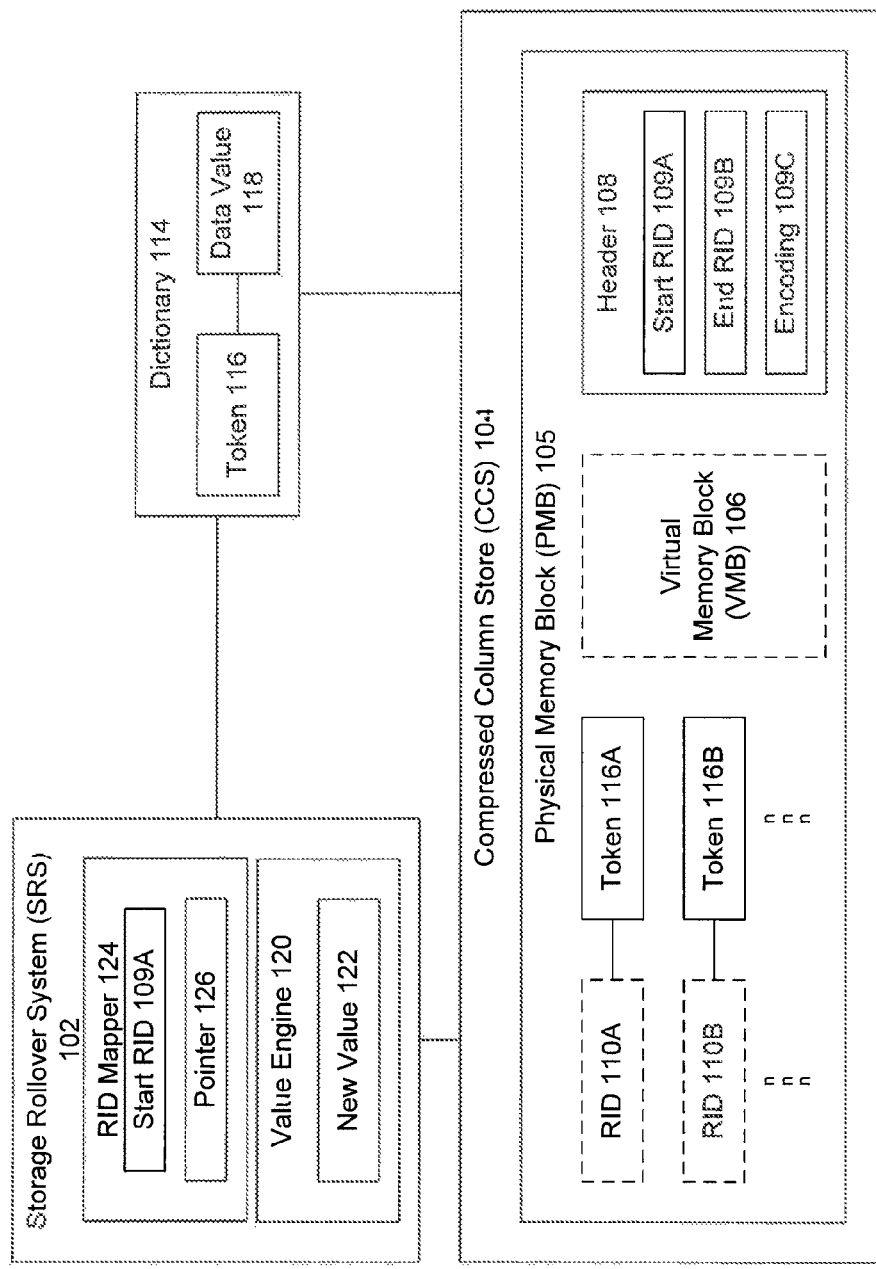
FIG. 1 is a block diagram of a storage rollover system, according to an example embodiment.

FIG. 1 is a block diagram 100 of a storage rollover system (SRS) 102, according to an example embodiment. SRS 102 may provide rollover strategies in an n-bit dictionary compressed column store, although the invention is not limited to this example.

In a dictionary compressed column-oriented database, unique values of the columns are stored in a data dictionary 114. Dictionary 114 generates a unique token 116 for every unique column value or data value 118 added to dictionary 114. The tokens 116 are then stored in memory blocks, such as physical memory block (PMB) 105 or virtual memory block (VMB) 106, of the column-oriented database.

Tokens 116 are compressed in PMB 105 or VMB 106 using an n-bit encoding. For example, a token 116 value from dictionary 114 may be compressed based on an encoding 109C of PMB 105. Each PMB 105 has only one type of encoding. When a new unique value 122 is to be added to dictionary 114 for compressed column store (CCS) 104, which may be a column-oriented database, a new token 116 is assigned to the new value 122 (which may be stored as data value 118).

If the current encoding of a memory block cannot accommodate a new token, either all the existing cells of the memory block must be re-encoded based on a new encoding within the memory block that allows the memory block to accommodate the new token, or a new memory block with new encoding must be allocated for the new token, leaving any remaining available memory of the existing memory block unused. As a result, the dictionary compressed column store becomes inefficient for very high cardinality (unique value) of columns. The re-writing of an entire column-store or a memory block may consume a lot of additional resources (e.g., such as processor and memory resources) and may cause very large spike in insertion time for new tokens.

When a new unique value 122 is added to CCS 104, if dictionary 114 can accommodate value 122, value 122 is added as data value 118 in the dictionary and a new token 116 is generated and stored in data block (PMB 105 or VMB 106). If however, data block cannot accommodate the new token 116 with current block encoding, CCS 104 may be rolled over a higher bit encoding and/or if the current capacity of dictionary 114 is exhausted, and dictionary 114 cannot generate or produce a new token 116, the new unique value 122 may be stored in a flat storage.

In an embodiment, dictionary 114 may be stored in an n-bit storage. In an n-bit storage "N" may indicate the value of an encoding, or number of bits, used to store information in the storage device. For example, 2-bit encoding storage may store up to 4 unique values. A problem may occur when the n-bit storage, with a designated n-bit encoding, of dictionary 114 cannot accommodate any new values. For example, if a $5^{th}$ unique value is received. As will be discussed in greater detail below, with regard to FIG. 3, SRS 102 may store or roll-over new values (that cannot be accommodated by the n-bit storage of dictionary 114) in a flat storage area of a composite store (e.g., including both n-bit storage and flat storage).

In an embodiment, SRS 102 allows new (higher N-bit) encoding for storing new tokens 116 in a column-oriented database, such as compressed column store (CCS 104), without reconfiguring all of the existing data (e.g., tokens 116) of a memory block, and without wasting available memory of a memory block. SRS 102 creates a virtual memory block (VMB) 106 within the available space of a physical memory block (PMB) 105 or another VMB 106 to store token 116 corresponding to a new unique value 122 within CCS 104.

CCS 104 may be a data structure, such as a column-oriented database used to store various data or tokens 116. Each token 116A, 116B may be compressed by N-bit encoding based on the type of encoding 109C used with PMB 105 or VMB 106. Each stored token 116A, 116B may have or be associated with a corresponding row identifier (RID) 110A, 110B by a RID mapper 124.

RID 110 may be any unique value or identifier used to refer to entries or tokens 116 of CCS 104. RID 110 may be a numeric indicator that indicates the position of a row in a table. For example, RID 110 may be a sequence of integers used to identify the row of a corresponding token 116.

For example, PMB 105 may be associated with a number of row identifiers (RIDs) 110 and corresponding tokens 116, which may in turn correspond to data values 118 stored in dictionary 114. RID 110 may correspond to a row in which the corresponding token 116 is stored. For example, if a column (e.g., data record) included "Country" values, Row 1 (i.e., RID 110A) may include token 116A corresponding to data value (e.g., 118) "India," Row 2 may include token 116B corresponding to data value "United States," Row 3 may include token 116C corresponding to data value "Canada," and so on. Though in FIG. 1, RIDs 110 are depicted within CCS 104, it may be that CCS 104 does not include actual RID 110 values. In an embodiment, RID 110 values may be stored in a mapping at RID mapper 124 and may be interpreted using start RID 109A, but are shown within CCS 104 to show the association between RIDs 110 and tokens 116.

SRS 102 adds new values 122 into dictionary 114 for use or reference by CCS 104, using the available memory of PMB 105 to store the corresponding tokens 116. For example, when first created, PMB 105 may be configured to store a particular number of tokens 116. Upon receipt of new unique value 122 for storage, and after creation or allocation of a corresponding token 116, SRS 102 checks to see whether there exists an unused location for storing token 116 within PMB 105 or VMB 106 of CCS 104. If there exists unallocated/free space for token 116, token 116 corresponding to new value 122 may be stored in CCS 104. If however, PMB 105 or VMB 106 cannot accommodate the new token value 116 within the current encoding of PMB 105 or VMB 106, SRS 102 may create a new VMB 106 in which to store the token 116 corresponding to new value 122 (stored in dictionary 114).

VMB 106 is a memory structure (within free contiguous memory of PMB 105 or VMB 106) that is created within a contiguous memory area of PMB 105 (or another VMB 106 within PMB 105). For example, both PMB 105 and VMB 106 may both include a header 108. Header 108 may include information about what data is stored in a memory block, and how the data is stored. As used herein, the term general "memory block" may be used to refer to a physical memory block (e.g., PMB 105) and/or a virtual memory block (e.g., VMB 106).

In an embodiment, header 108 may include metadata such as start RID 109A, end RID 109B, and encoding 109C. Start RID 109A may be an indication of what is the number, value, or identifier of the first RID 110 corresponding to a token 116 stored in a memory block. For example, if the first RID 110A is row 0001, start RID 109A may be "0001." End RID 109B may be an indication of what is the number/value of the last or most recent RID 110 corresponding to a token 116 stored in a memory block. In an embodiment, RID mapper 124 may include, in addition to pointer 126 to memory block, start RID 109A that specifies the first or beginning RID value 110 of each memory block.

Encoding 109C refers to how many bits (e.g., 0 or 1 values) are used to store—a tokens 116. For example, 2-bit encoding 109C may store up to four unique values or compressed tokens 116 (00 (token=0), 01 (token=1), 10 (token=2), 11 (token=3)). Similarly, 3-bit encoding 109C may store up to eight tokens 116, and so on.

In system 102, each memory block (PMB 105 and VMB 106) may have its own encoding 109C that has a corresponding limit on token values. For example, 2-bit encoding has limit of 3 token values (e.g., 0-3), only token value less than or equal to 3 can be inserted into a memory block with 2-bit encoding. However, in systems that use only physical memory blocks for storage, each physical memory block may only have one type of encoding, as specified in header 108. Encoding 109C represents a compressed way to store and refer to tokens 116 stored in CCS 104.

In an alternative system, when a physical memory block is created for a column-oriented database, a type of encoding is selected based upon the number of unique values that are stored in dictionary 114. For example, 5-bit encoding may be selected if dictionary 114 has between 17 and 32 unique column (data) values 118.

On the other hand, if dictionary 114 needs to store more than the current encoding will allow, for example, 33 values for a 5-bit or fewer type of encoding, then either the entire memory block must be reconfigured to use at least 6-bit encoding, which can consume additional system resources and slow-down system processing. Previously written tokens 116 must then be re-encoded or rewritten as other operations may be reading those values, which may lead to data inconsistency. Or a new memory block must be allocated for the additional value(s), which again may result in a large number of allocations and unused memory locations.

SRS 102 provides a storage rollover with n-bit encoding that addresses the issues with such systems. SRS 102 efficiently allocates memory resources within CCS 104. For example, CCS 104 may include PMB 105 that has header 108 indicating encoding 109C for PMB 105. A value engine 120 may add new values 122 to dictionary 114, which are assigned tokens 116 for storage in PMB 105, and create VMBs 106 within PMB 105 as the size (e.g., number of unique values or tokens 116) of CCS 104 increases.

New value 122 may be any value or alphanumeric character sequence associated with a cell of CCS 104 and stored in dictionary 114. When value engine 120 stores new values 122 in dictionary 114, dictionary 114 generates or assigns a token 116 for each unique new value 122, and value engine 120 stores the assigned token 116 within the allocated memory locations of PMB 105 or VMB 106 based on encoding 109C. CCS 104 may then update end RID 109B. In an embodiment, CCS 104 may update header 108 as new values 122 are added to dictionary 114 and corresponding tokens 116 are stored in PMB 105. For example, if end RID 109B is "10," and a corresponding token 116 for new value 122 is added to PMB 105, end RID 109B may be updated to "11."

RID mapper 124 may include pointer 126 to header 108 of PMB 105. Similarly, RID mapper 124 may include pointer 126 to header 108 of any VMBs 106. In an embodiment, RID mapper 124 may include a storage structure such as an array that stores a relationship or correspondence between RIDs 110 and memory block locations of the RIDs 110. In an embodiment, RID mapper 124 may compute an offset of a particular memory location within a memory block. For example, if a particular memory block includes RID values 50-200, but the RID value 100 is sought, RID mapper 124 may compute the offset within the memory block to be 50 (e.g., computed by subtracting 50 from 100).

In an embodiment, RID mapper 124 does not store a mapping for each RID 110. For example, RID mapper 124 may store a mapping for a new memory block (PMB 104 or VMB 106) and the start RID 109A of each memory block. Then, for example, when a query or search for a particular RID 110 is performed, RID mapper 124 will return pointer 126 to the corresponding memory block. Based on start RID 109A and pointer 126 to the memory location, the offset of the queried RID 110 may be computed.

A program or user may request a data value 118 stored in a particular column of CCS 104. RID mapper 124 may identify a RID 110 corresponding to the requested cell or column/row of CCS 104. For example, the value stored in RID "125" may be requested. RID mapper 124 may then determine the physical memory address corresponding to a memory block (PMB 105 or VMB 106) in which token 116 corresponding to RID "125" is stored. The actual data value 118 may be retrieved from dictionary 114 based on the corresponding token 116 from CCS 104.

In an embodiment, RID mapper 124 may store the physical or memory address of PMB(s) 105 or VMB(s) 106 and the first RID 110 of PMB 105 or VMBs 106. Based on the stored information, RID mapper 124 may determine which memory block includes the greatest (i.e., highest value) start RID 109A with a value less than the requested RID value "125." Then for example, RID mapper 124 may return a corresponding pointer 126 to that memory block. In an embodiment, pointer 126 may include a pointer to header 108 of the memory block. From header 108, the offset to the exact location of the requested value may be determined based on start RID 109A and encoding 109C.

As noted above, value engine 120 adds new values 122 to dictionary 114 and stores corresponding tokens 116 in PMB 105 or VMB 106 in the remaining allocated memory locations (as determined from the metadata of header 108). If, however, encoding 109C of a current memory block (PMB 105 or VMB 106) cannot accommodate a new token value 116, value engine 120 may create a (new) virtual memory block (VMB) 106. Value engine 120 may allocate a portion (or all) of the remaining memory space of PMB 105, as VMB 106. VMB 106 may have a new level of encoding 109C, generally greater than the encoding of the current memory block.

Value engine 120 may determine whether there is enough remaining space within current PMB 105 or VMB 106 to create a new VMB 106 (with corresponding header 108). The amount of space necessary may vary in different embodiments. For example, in an embodiment, value engine 120 may determine whether there is enough memory space remaining in PMB 105 or VMB 106 to create a VMB 106 capable of holding four additional values (e.g., 2-bit encoding 109C) or to create a VMB 106 with an increased encoding from encoding 109C of the existing PMB 105. If there is not enough space remaining in PMB 105 or VMB 106 to create a new VMB 106, value engine 120 may store new value 122 in a new PMB 105.

If, however, there is enough space remaining in PMB 105 or VMB 106 for VMB 106, value engine 120 may create a new VMB 106, including a corresponding header 108, in PMB 105. Value engine 120 may determine or assign encoding 109C for the new VMB 106. For example, if PMB 105 uses 4-bit encoding, VMB 106 may use 5-bit encoding. Value engine 120 may then store tokens 116 corresponding to new values 122 in the new VMB 106, and update start RID 109A and end RID 109B to reflect the storage or entry of new value 122 in a new VMB 106. If however, PMB 105 or VMB 106 is full (i.e., if the physical space is full, or there is not sufficient space for a new VMB 106), value engine 120 may store additional tokens 116 in a new or different PMB 105.

Creating or using VMBs 106 may allow SRS 102 to store new values 122 in dictionary 114 and corresponding tokens 116 in cells of CCS 104 without requiring the reallocating or reconfiguration the existing tokens 116 of to the current PMB or VMB to a higher encoding (e.g., 109C). This may be especially useful if, for example, other systems or programs are currently accessing or reading one or more data values 118 or tokens 116. Also, using VMBs 106 allows SRS 102 to make efficient use of contiguous memory addresses without requiring the allocation of a new PMB 105, if there is used memory space available in a previously allocated PMB 105.

As noted above, VMB 106 may be structured similar to PMB 105, with respect to including a header 108. As such, access to VMB 106 will not differ or include additional overhead to a requester, reader, or other end user of tokens 116. RID mapper 124 may return pointer 126 to the beginning of a memory block (PMB 105 or VMB 106) corresponding to RID 110, regardless of whether the token 116 is stored in VMB 106 or directly in PMB 105. From an end user perspective, accessing tokens 116 stored in CCS 104 remains unchanged and requires no additional overhead, notification, or other code modification on the side of the requesting program or user.

As noted, dictionary 114 may be used to store data values 118 for CCS 104, particularly those values that are repeated. For example, a column or record of CCS 104 may be used to store the first names of customers. The record may include twenty entries, including the names "Rachel" and "Joe" which may be repeated four and six times, respectively. Instead of storing the name "Rachel" four times in CCS 104, which can consume extra memory space, the name "Rachel" may be stored once as data value 118 in dictionary 114, and a corresponding token 116 for "Rachel" may be created or provided. Then for example, token 116 may be stored within CCS 104 wherever "Rachel" is designated as the data value 118 for the first name. A second data value 118 of dictionary 114 may be created for "Joe," and a second token 116 for "Joe" may be generated for storage in CCS 104.

SRS 102 provides n-bit rollover for CCS 104. SRS 102 allows for the creation and use of VMBs 106 within an allocated or assigned PMB 105 that is already being used to store tokens 116 corresponding to data values 118 of CCS 104. By implementing n-bit rollover, SRS 102 is able to efficiently allocate contiguous available memory space in a computing system, making efficient use of the available resources.

Figure 2:
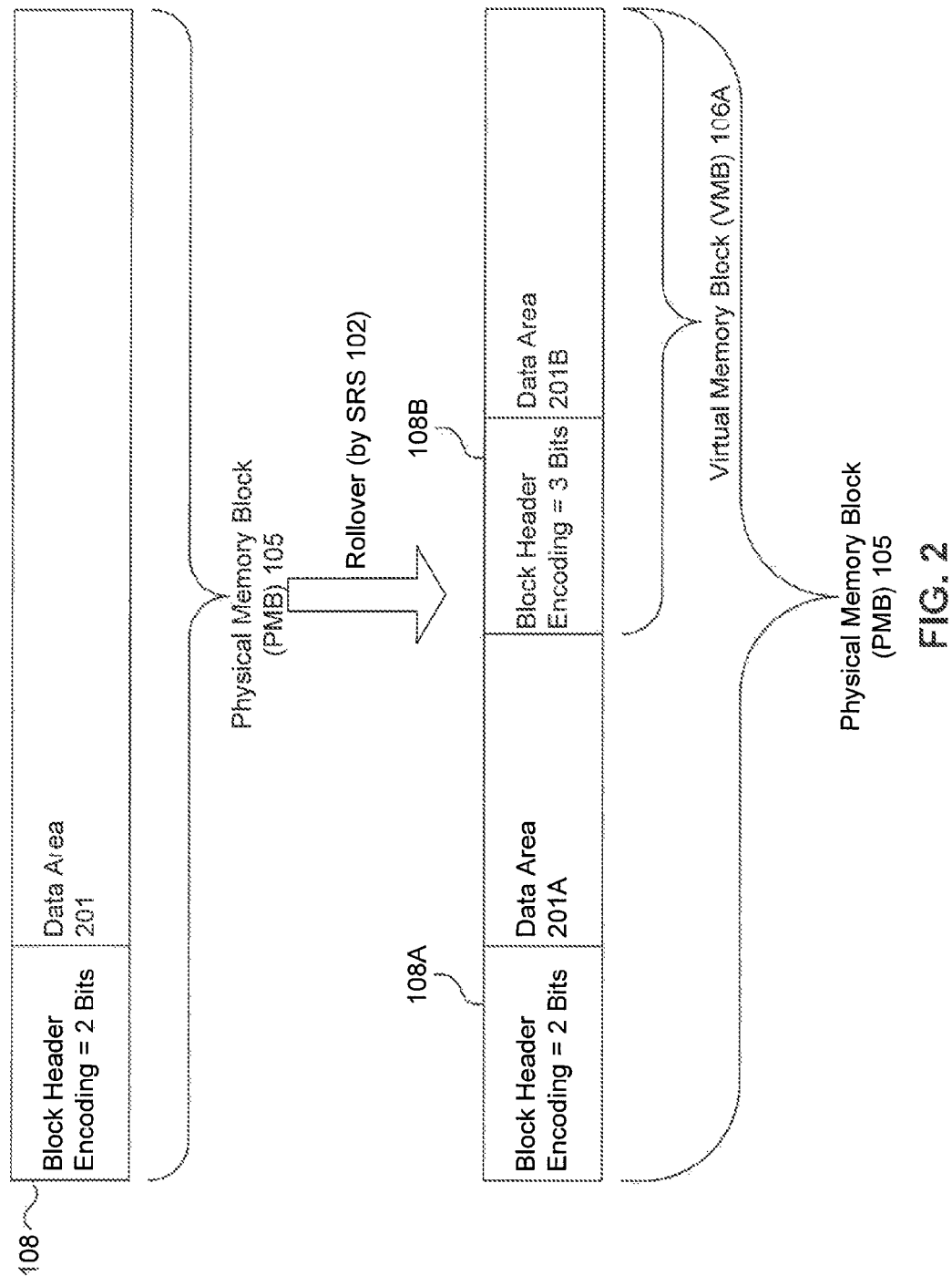
FIG. 2 is a block diagram of a physical memory block with rollover storage, according to an example embodiment.

FIG. 2 is a block diagram 200 of a physical memory block 105 with rollover storage, according to an example embodiment. For illustrative, non-limiting purposes, the components of FIG. 2 will be described with reference to identically numbered components of FIG. 1. PMB 105 may be assigned to store tokens 116 corresponding to data values 118 of CCS 104. PMB 105 includes header 108, and a data area 201. Data area 201 may be available space or physical memory of PMB 105 available to store headers 108, tokens 116, and/or other data. As shown, PMB 105 may include an encoding (109C) of 2 bits, which may accommodate up to four tokens 116 (four unique value).

Upon receipt of new unique value 122 by value engine 120, dictionary 114 assigns a new token 116 to new unique value 122 and stores the mapping between value 122 and token 116 for future use. If the token value generated by dictionary 114 is four (e.g., the new token 116 corresponds to the fifth unique data value 118), token value four cannot be accommodated in a 2-bit encoding of memory block (e.g., 2-bit encoding is only used as an exemplary value, but other embodiments may include other types of n-bit encoding). The new token four 116 will require 3-bit encoding to store token value four. Value engine 120 may then create a new virtual memory block (VMB) 106A within an allocated but unused portion of data area 201. SRS 102 may then rollover the encoding and assign an increased encoding (109C) to VMB 106A. As shown, VMB 106A may be assigned 3-bit encoding. The previously stored tokens 116 and RIDs 110 of CCS 104 may remain unchanged in data area 201A, while the remaining memory (or a portion thereof) of data area 201 is partitioned or otherwise allocated as VMB 106A.

VMB 106A may include its own header 108B and own data area 201B used to store tokens 116 or other data. Value engine 120 may store a token 116 corresponding to new value 122 within the data area 201B of VMB 106A. If there is enough space remaining within VMB 106, (e.g., within data area 201B of VMB 106A), a second VMB 106 (not shown) with its own header 108 and allocated data area 201 may be created with an increased encoding of 4-bits. This process may repeat for new values 122 so long as there is remaining available space in last VMB 106.

Figure 3:
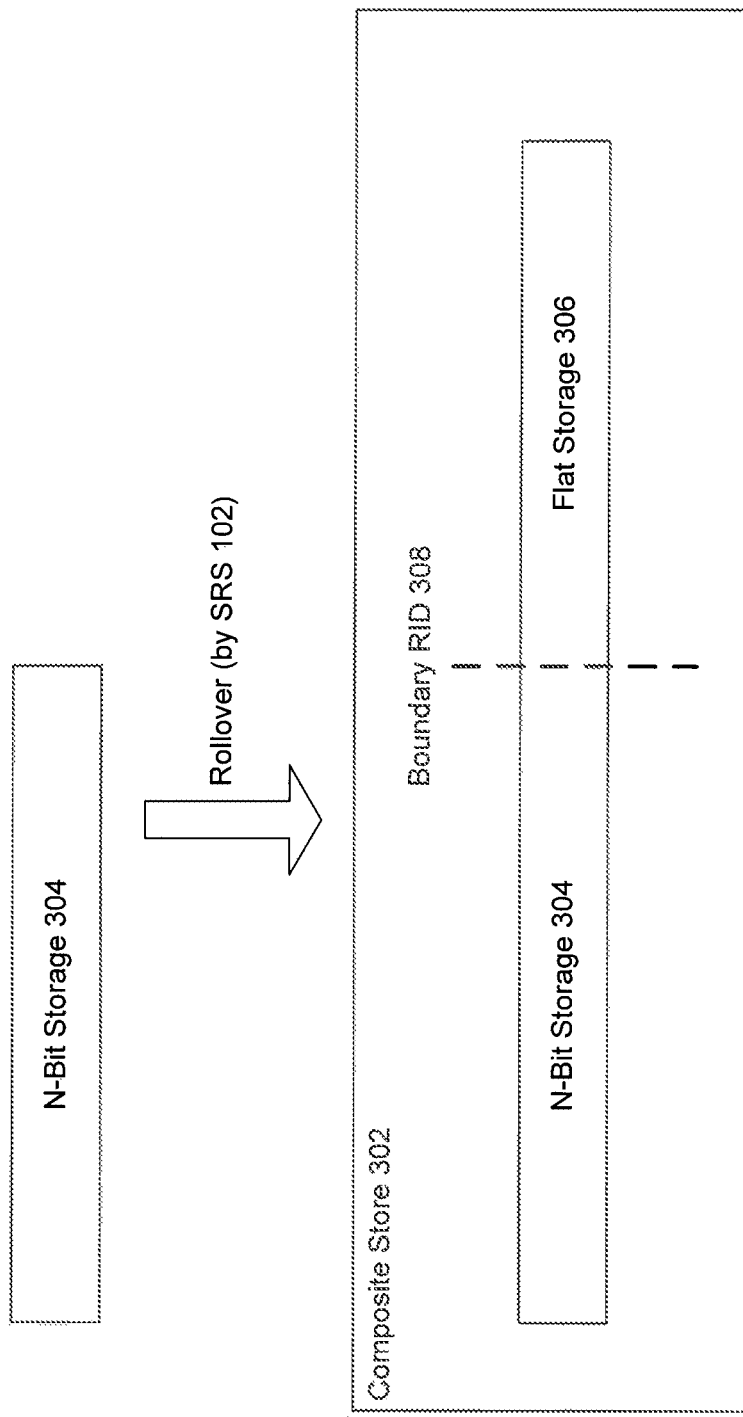
FIG. 3 is a block diagram of a composite store, according to an example embodiment.

FIG. 3 is a block diagram 300 of a composite store 302, according to an example embodiment. For illustrative, non-limiting purposes, the components of FIG. 3 will be described with reference to identically numbered components of FIG. 1.

In an embodiment, PMB 105 may be an n-bit storage 304. N-bit storage 304 may a storage structure or memory, such as random access memory (RAM), that allows for encoding 109C to store tokens 116 of CCS 104. "N" may designate the number of bits used in encoding 109C for n-bit storage 304. In an embodiment, "n" may be limited to a maximum value, such as 31.

When new value 122 is provided to SRS 102, new value 122 may be provided to dictionary 114 for storage. Dictionary 114 may first check to see if new value 122 has been previously stored in dictionary 114. If new value 122 has previously been stored in dictionary 114, the existing or corresponding token 116 may be returned for storage in CCS 104. If however, new value 122 has not been previously stored in dictionary 114, dictionary 114 may create a new token 116 for the data value 118 of new value 122.

In an embodiment, dictionary 114 may have a maximum number of tokens 116 that may be created. The maximum number of tokens may vary by system, and may correspond to encoding 109C. If dictionary 114 has not reached the maximum number of available tokens 116, the new value 122 may be stored in the available space of n-bit storage 304.

If however, the maximum number of tokens 116 has been reached, SRS 104 may store data value 118 of new value 122 in a flat storage 306. Flat storage 306 may include the actual data value 118 of an inserted value, as opposed to the corresponding token 116. As such, in flat storage 306, the value "Europe" may be stored several times; while in dictionary 114 using n-bit storage 304, "Europe" may only be stored once in dictionary 114 while the corresponding token 116 may be stored several times. In an embodiment, dictionary 114 may be limited to 32-bit tokens, but other embodiments may use other token limitations. In an embodiment, once a first PMB 105 with n-bit storage 304 is full, a new n-bit storage 304 PMB 105 may be allocated to store additional tokens 116 for additional new values 122 in CCS 104. In another embodiment, SRS 102 may store additional new values 122 (once n-bit storage 304 is full) in a flat storage 306 (e.g., without the use of tokens 116). The combination of using n-bit storage 304 and flat storage 306 for storing tokens 116 of CCS 104 may be referred to as a composite store 302. Flat storage 306, in contrast to n-bit storage 304, may simply store values in appended, incremented data slots without using any particular encoding schema.

Composite store 302 may be a storage mechanism used for storing tokens 116 of CCS 104 in various types of data storage or data structures, for example, using n-bit storage 304 and flat storage 306. Data values 118 stored in composite store 302 may be accessed by a requestor in the same manner as values stored in n-bit storage 304 or flat storage 306. For example, RID mapper 124 may return pointer 126 to a memory location of a value stored in flat storage 306.

Flat storage 306 however, unlike n-bit storage 306, does not include type encoding in block header. It may have a header similar to n-bit storage 304.

A boundary RID 308 may be a last RID of n-bit storage 304 or a first RID of flat storage 306 and may provide a point of delineation between n-bit storage 304 and flat storage 306. Based on boundary RID 308, a read operation decides or determines which storage (e.g., flat storage 306 or n-bit storage 304) includes the desired RID. Once the proper storage is identified, the RID is identified in the same manner as previously described in the identified storage. Once composite storage is created, new values will always be inserted into flat storage 306, as n-bit storage 304 may be closed to subsequent write operations. The performance, with usage of a composite store (n-bit storage 304 and flat storage 306) is comparable to the performance of writing into a flat storage 306 alone.

Figure 4:
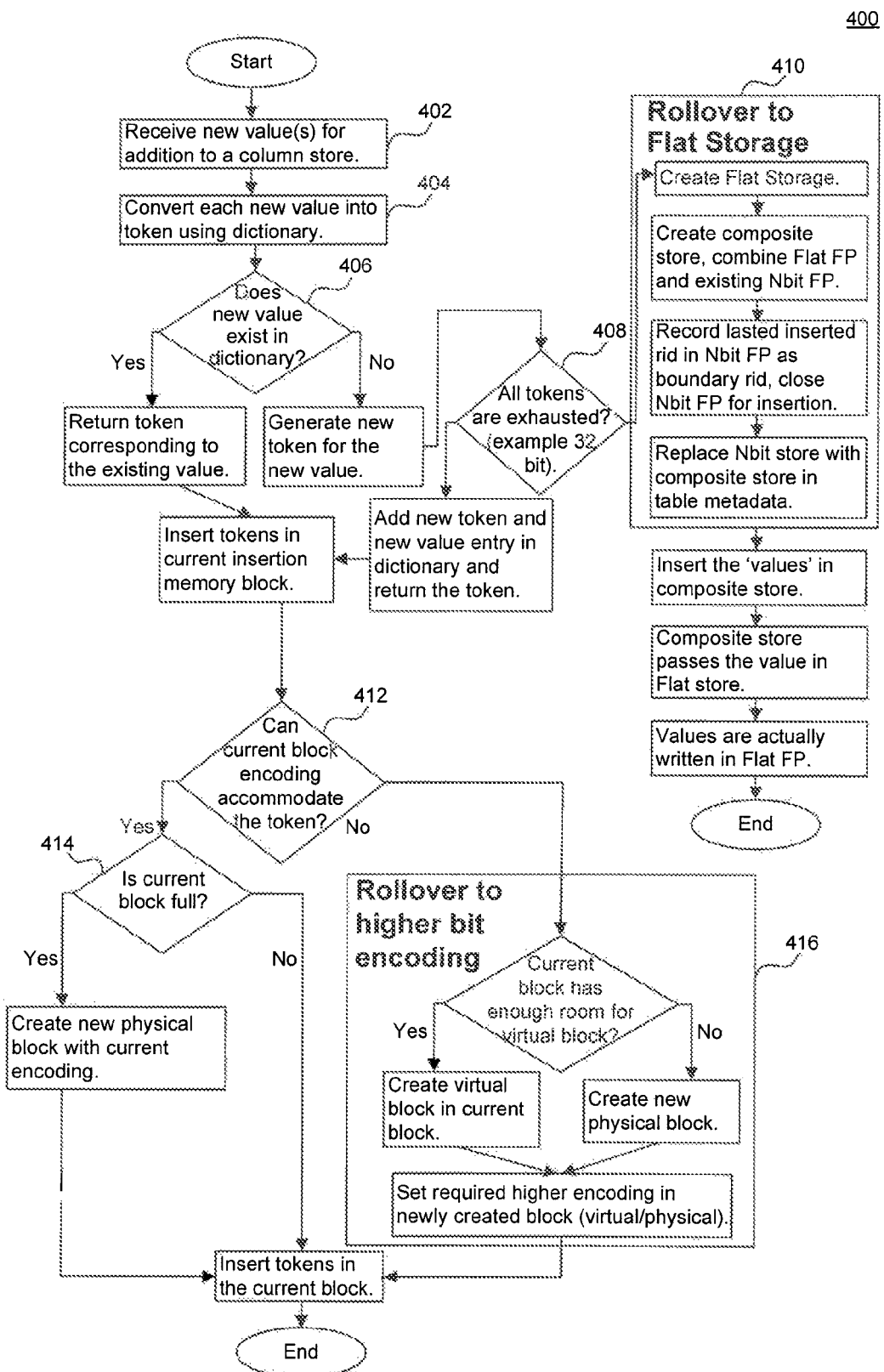
FIG. 4 is a flowchart illustrating a process for implementing a rollover strategy in an n-bit dictionary compressed column store, according to an example embodiment.

FIG. 4 is a flowchart 400 illustrating a process for providing rollover strategies in an n-bit dictionary compressed column store, according to an example embodiment.

New value 122 is received for storage in CCS 104 (402), which is provided to dictionary 114 for conversion into token 116 (404). If data value 118 corresponding to new value 122 already exists, the existing token 116 is returned for new value 122, otherwise a new token 116 is generated (406). Data value 118 is added to dictionary 114, and corresponding newly created token 116 is returned if the token 116 value has not been exhausted, otherwise SRS 102 rolls over to using flat storage 306 (408).

If a rollover to a composite store is necessary (410), then as described above with respect to FIG. 3, data value 118 may be stored in flat storage 306, and metadata of CCS 104 may be updated to indicate a composite store is being used. Subsequent new values may then be appended within flat storage 306.

If a rollover to a composite store is not necessary (412), SRS 102 determines whether the current encoding 109C can accommodate the token 116 value. If so, then SRS 102 determines whether PMB 105 is full (414), which if it is full, a new PMB 105 is allocated, otherwise the token 118 is added to the current block.

If the current encoding 109C cannot accommodate the token 118, SRS 102 rolls over to a higher bit encoding 109C (416). As described above with regard to FIG. 1, either a new VMB 106 or PMB 105 may be created with a new higher bit encoding value 109C, and token 118 may be stored in the newly created memory block.

Example Computer System

Figure 5:
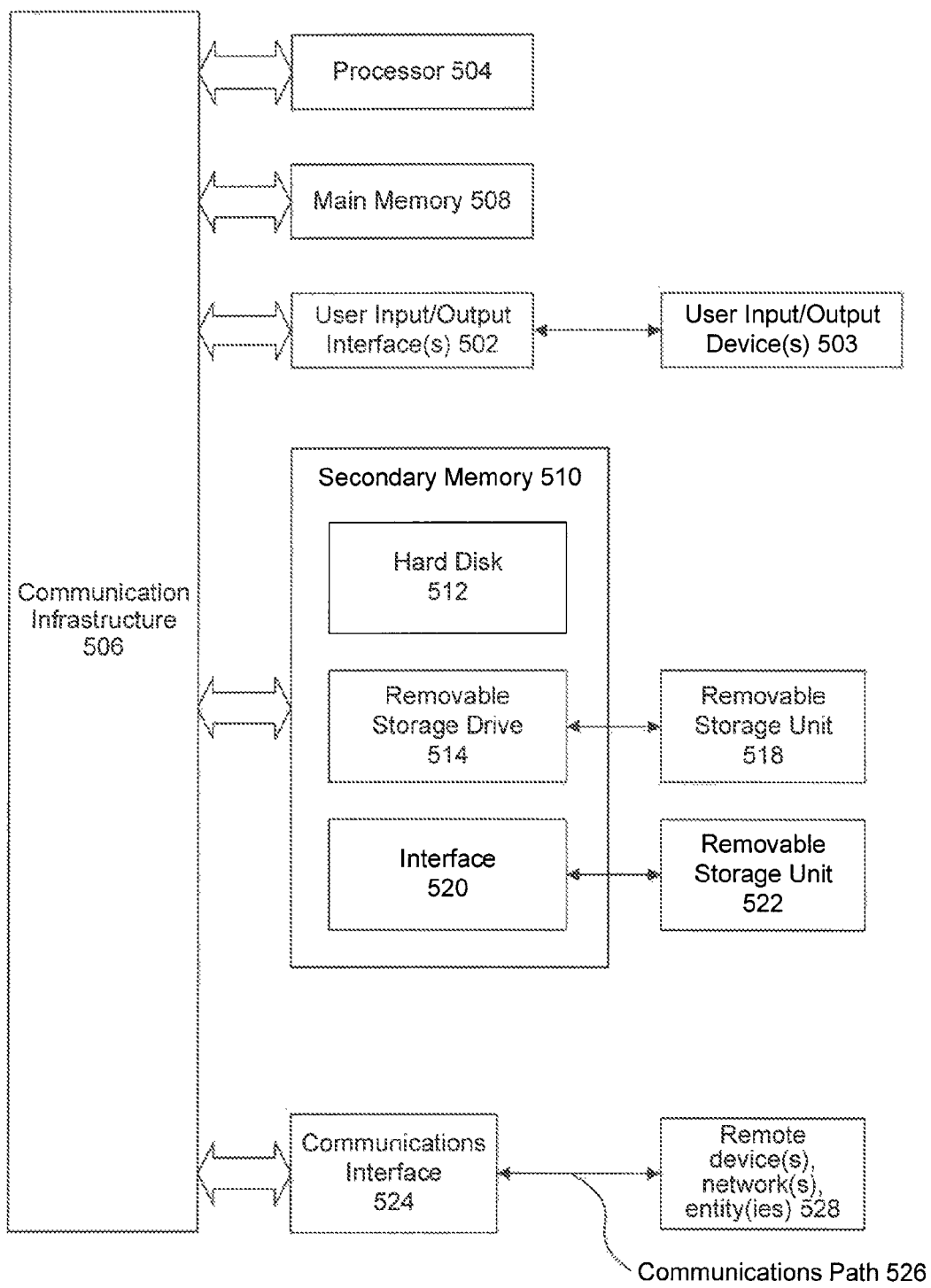
FIG. 5 is an example computer system useful for implementing various embodiments.

Various embodiments can be implemented (such as those shown in the figures), for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
receiving a new value for addition to a compressed column store, the compressed column store including a plurality of tokens, each token corresponding to a value in a data dictionary, and being associated with a row identifier (RID) in the compressed column store;
determining an insertion block of the compressed column store, the insertion block being a physical or virtual memory block where new tokens are inserted;
determining that a current memory block of a most recently added token to the compressed column store is the insertion block, the compressed column store including one or more memory blocks each with a maximum token value that indicates a storage capacity for tokens within a respective memory block based on an encoding of the respective memory block;

determining that the maximum token value has been reached for the current memory block based on type of encoding of the current memory block;

creating a new virtual memory block using the current memory block, wherein the new virtual memory block has an encoding greater than the encoding of the current memory block, wherein the new virtual memory is designated as the insertion block, and wherein the tokens of the current memory block remain in the current memory block while new tokens are stored in the virtual memory block; and storing a token corresponding to the new value in the new virtual memory block, wherein the token corresponding to the new value in the new virtual memory block is accessed in a same manner as existing tokens in the current memory block.

2. The method of claim 1, wherein the current memory block is a first virtual memory block.

3. The method of claim 1, wherein the creating comprises:
determining that the current memory block is at full capacity;
creating a new physical memory block; and
storing the token corresponding to the new value in the new physical memory block, wherein the new physical memory block is assigned an encoding based on the token corresponding to the new value.

4. The method of claim 1, wherein each physical and virtual memory block includes a header comprising a start Rip, an end RID, and an encoding value corresponding to encoding of a respective memory block.

5. The method of claim 4, wherein each of two or more virtual or physical memory blocks of the compressed column store have different encoding values.

6. The method of claim 1, wherein the new value is stored in the data dictionary, and wherein the token corresponding to the new value is used to access a data value corresponding to the new value from the data dictionary.

7. The method of claim 1, wherein a write operation for writing the token into the new virtual memory block is identical to a write operation for writing the token into the physical memory block.

8. The method of claim 1, wherein a read operation for reading the token from the new virtual memory block is identical to a read operation for reading the token from the physical memory block.

9. The method of claim 1, wherein the creating comprises:
creating a new virtual memory block using the current memory block based on the determination that the maximum token value has been reached for the type of encoding of the current memory block.

10. The method of claim 1, further comprising:
receiving, subsequent to the creating, a second new value, wherein the second new value is stored in the virtual memory block.

11. A system comprising:
a processor; and
a tangible memory communicatively coupled to the processor including instructions thereon that when executed by the processor cause the processor to:

receive a new value for addition to a compressed column store, the compressed column store including a plurality of tokens, each token corresponding to a value in a data dictionary, and being associated with a row identifier (RID) in the compressed column store, determine an insertion block of the compressed column store, the insertion block being a physical or virtual memory block where new tokens are inserted, determine that a current memory block of a most recently added token to the compressed column store is the insertion block, the compressed column store including one or more memory blocks each with a maximum token value that indicates a storage capacity for tokens within a respective memory block based on an encoding of the respective memory block, determine that the maximum token value has been reached for the current memory block based on type of encoding of the current memory block create a new virtual memory block using the current memory block, wherein the new virtual memory block has an encoding greater than the encoding of the current memory block, wherein the new virtual memory is designated as the insertion block, and wherein the tokens of the current memory block remain in the current memory block while new tokens are stored in the virtual memory block, and store a token corresponding to the new value in the new virtual memory block, wherein the token corresponding to the new value in the new virtual memory block is accessed in a same manner as existing tokens in the current memory block.

12. The system of claim 11, wherein the current memory block is a first virtual memory block.

13. The system of claim 11, wherein the instructions that cause the processor to create comprise instructions that cause the processor to:
determining that the current memory block is at full capacity;
create a new physical memory block; and
storing the token corresponding to the new value in the new physical memory block, wherein the new physical memory block is assigned an encoding based on the token corresponding to the new value.

14. The system of claim 11, wherein each of two or more virtual or physical memo~7 blocks of the compressed column store have different encoding values.

15. The system of claim 11, wherein the new value is stored in the data dictionary, and wherein the token corresponding to the new value is used to access a data value corresponding to the new value from the data dictionary.

16. The system of claim 11, wherein a write operation for writing the token into the new virtual memory block is identical to a write operation for writing the token into the physical memory block.

17. The system of claim 11, wherein a read operation for reading the token from the new virtual memory block is identical to a read operation for reading the token from the physical memory block.

* * * * *